Jan. 12, 1971 TOSHINORI HORIGOME 3,555,462
WAVEGUIDE-SLOW WAVE STRUCTURE IMPEDANCE MATCHING DEVICE
Filed Nov. 17, 1967

INVENTOR.
TOSHINORI HORIGOME
BY
Hopgood & Calimafde
ATTORNEYS

United States Patent Office 3,555,462
Patented Jan. 12, 1971

3,555,462
WAVEGUIDE-SLOW WAVE STRUCTURE IMPEDANCE MATCHING DEVICE
Toshinori Horigome, Tokyo, Japan, assignor to Nippon Electric Company, Limited, Tokyo, Japan, a corporation of Japan
Filed Nov. 17, 1967, Ser. No. 683,973
Claims priority, application Japan, Nov. 17, 1966, 41/75,608
Int. Cl. H03h 7/30
U.S. Cl. 333—31                                      2 Claims

ABSTRACT OF THE DISCLOSURE

An impedance matching device for matching a loaded waveguide type slow-wave structure and an external waveguide divided by a partition wall including a coupling slot coupling loop pair in the partition wall, the dimensions of the coupling loop being varied to vary the impedance.

BACKGROUND OF THE INVENTION

In order to operate a traveling-wave tube, it is necessary to introduce a high frequency signal into the tube and to receive the signal from the tube. The introduction and reception of the signal are normally carried out at coupling portions between the slow-wave structure in the interior of the traveling-wave tube, and waveguides at the exterior of the traveling-wave tube. Since, however, the respective impedances of the slow-wave structure and the external waveguides are generally different, that is, the impedance of the slow-wave structure is generally high, while that of the external waveguide is low, an impedance discontinuity appears at the coupling portion of the slow-wave structure and the external waveguide. The existence of this impedance discontinuity results in the inefficient use of the introduced high frequency signal (or the driving R.F. power) as well as the output power. Further, the tube is liable to oscillate.

Particularly, in case of high power traveling-wave tubes, serious damage of the slow-wave structure is likely to result due to reflection of the traveling high frequency signal due to the discontinuity. Consequently, the elimination of the impedance discontinuity is necessary.

Conventional methods for impedance matching provide either an inductive window at a portion of the external waveguide adjacent to the coupling portion, or a projection within the coupling portion. However, these conventional matching devices result in the addition of a lumped constant element in the path between the slow-wave structure and the external waveguide, the bandwidth thus becomes narrower, and in case of the provision of a projection, the electric field in the slow-wave structure is concentrated in the projection and is liable to spark.

OBJECT OF THE INVENTION

The object of the present invention is to eliminate the foregoing defects and provide an impedance matching device of broad bandwidth with superior impedance matching characteristics.

SUMMARY OF THE INVENTION

According to the invention, the partition wall between the loaded waveguide type slow-wave structure and the external waveguide is provided with a combination coupling slot and coupling loop so that the coupling of the electromagnetic fields appearing at both sides of the partition wall may be changed by the combination, whereby the impedance of the slow-wave structure and that of the external waveguide are matched effectively.

The impedance matching device of the invention is predicated upon the fact that the degree of coupling of the electromagnetic fields varies by changing the configuration of the combination of the coupling slot and coupling loop, thereby varying the impedances of the cavities located on either side of the partition wall provided with the combination. As mentioned, the impedance of the external waveguide is lower than that of the slow-wave structure; it is therefor desirable to lower the impedances in the cavities by increasing the degree of coupling of the electromagnetic fields due to the combination. Since an increase in the degree of coupling lowers the impedances and also broadens the pass bandwidth, the matching device of this invention has superior impedance matching characteristics as well as broader bandwidth.

The above mentioned and other features and objects of this invention and the manner of attaining them will become more apparent and the invention itself will best be understood by reference to the following description of an embodiment of the invention taken in conjunction with the accompanying drawings, the description of which follows.

DESCRIPTION OF THE DRAWINGS

FIG. 1 shows one example of a conventional impedance matching device having an inductive window 13 disposed in the connecting portion of slow-wave structure 11 and external waveguide 12. FIG. 2 shows an example of a conventional matching device where a projection 15 is provided in the coupling portion 14 between loaded waveguide type slow-wave structure 11 and external waveguide 12.

Figure 1:
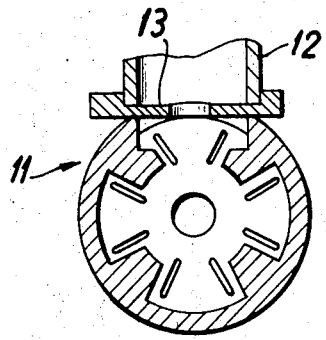
FIG. 1 is a transverse section of one example of a conventional impedance matching device.

For purposes of explanation, the latter structure will be discussed. The slow-wave structure 11 has a construction including disc metal plates or partition walls 17 fitting tightly into a metallic circumferential wall 16 of a cylindrical waveguide. The discs are disposed within the cylindrical waveguide in perpendicular relation to the center axis. Each of the disc-shaped partition walls 17 is provided with an aperture 18 at its center for passing an electron beam as well as a circumferential means 19 for coupling the electromagnetic fields. Means 19 for coupling the electromagnetic fields may take the form of a coupling slot in kidney-shape, a coupling loop passing through the partition wall 17, and the combination of a coupling slot and a coupling loop.

A slow-wave structure of the loaded waveguide type may be classified into two categories according to the state of the arrangement of the partition walls and the number of means for coupling the electromagnetic fields; one is a slow-wave structure where the fundamental wave is a forward wave, and the other is a slow-wave structure where the fundamental wave is a backward wave.

Figure 2:
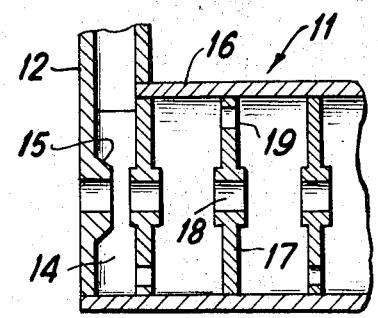
FIG. 2 is a longitudinal section of a second conventional impedance matching device.
Figure 3B:
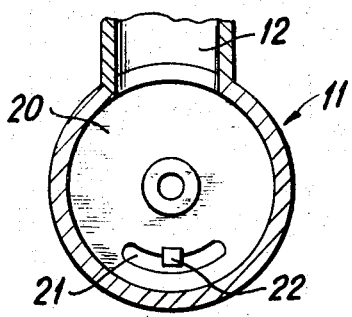
FIG. 3(b) is a section taken along the line b–b' of FIG. 3(a).
Figure 3A:
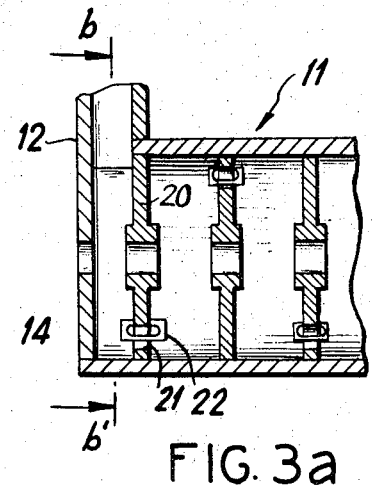
FIG. 3(a) is a longitudinal section of an impedance matching device according to the present invention.

Referring to FIGS. 3(a) and (b), the matching device according to the present invention is constructed in such a way that a partition wall 20 which divides the loaded waveguide type slow-wave structure 11 and external waveguide 12 is provided with a combination of a coupling slot 21 and a coupling loop 22 at the coupling portion 14 of the slow-wave structure and the external waveguide. This slow-wave structure 11 has the fundamental wave of a backward wave and is similar to that shown in FIG. 2. By changing the shape and dimension of the coupling loop 22, the degree of coupling of the electromagnetic fields on both sides of the partition wall 20 is varied, and consequently, the pass bandwidth and the impedances are also varied.

Figure 4:
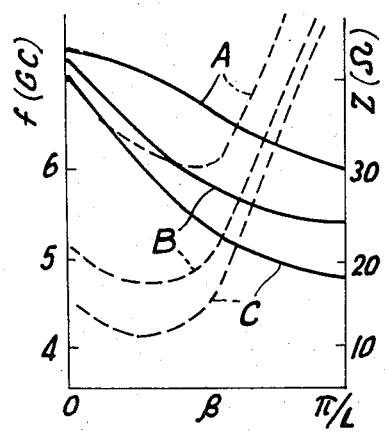
FIG. 4 shows graphically the frequency and coupling impedance characteristics at the different dimensions of the coupling loop.

In FIG. 4 the phase constant $\beta$ is taken as the abscissa and the frequency $f$ and the coupling impedance Z as the ordinate, on arbitrary scales. The dimensions of the coupling loop 22 is set as a parameter and indicated as A, B and C depending on its being either small, medium or large. The frequency characteristic is indicated in solid lines and the coupling impedance characteristic by broken lines. From the graph, it may be seen that the relationship between the dimension of the coupling loop 22 and the pass bandwidth or coupling impedance is such that the pass bandwith is broadened and the coupling impedance is lowered with an increase in the dimension of the coupling loop.

On the other hand, inasmuch as the circuit impedance of the slow-wave structure is determined uniquely by the coupling impedance, if the construction of cavity is fixed, a variation in the coupling impedance results in a variation in the circuit impedance. Accordingly, the circuit impedance can be varied by changing the shape and the dimension of the coupling loop 22. As the result, and according to this invention, it is possible to approximate the value of the circuit impedance at the coupling portion 14 to the value of the impedance of the external waveguide 12.

In case the value of the impedance of the slow-wave structure 11 and that of the external waveguide 12 greatly differ, there is a steep impedance gradient in the neighborhood of the coupling portion 14. Accordingly, it is desirable to moderate the impedance difference by changing the impedance of the slow-wave structure 11 at the portion near the coupling portion 14. To this end, it is effective to apply the invention as well to the several partition walls in the neighborhood of the partition wall 20. That is, the slow-wave structure is constructed so that the partition wall 20 and the several partition walls in the neighborhood thereof are provided with the combination of a coupling slot and a coupling loop, respectively. The dimensions of the coupling loops are made gradually smaller as they are removed from the partition wall 20, to match the slow-wave structure 11 and the external waveguide 12 with a moderate impedance gradient.

It has been found that the number of partition walls affected is only a few considering the slow-wave structure as a whole and therefore no substantial influence is effectuated upon the various characteristics of the slow-wave structure.

Figure 5:
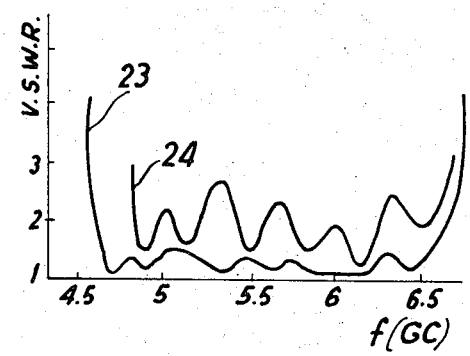
FIG. 5 illustrates comparative impedance matching characteristics for conventional and inventive impedance matching devices.

FIG. 5 shows the frequency $f$ plotted against the voltage standing wave ratio (V.S.W.R.) on an arbitrary scale. It is clear from the graph that the matching characteristic 23 of a matching device according to the invention has a broader frequency bandwidth and a smaller and smoother V.S.W.R. than the matching characteristic 24 of the conventional matching device.

Although, in the embodiment shown in FIG. 3, a loaded waveguide type slow-wave structure 11 is employed wherein the fundamental wave is a backward wave, the same effect can be realized in a slow-wave structure whose fundamental wave is a forward wave.

While the principles of the invention have been described in connection with specific apparatus, it is to be clearly understood that this description is made only by way of example and not as a limitation to the scope of the invention as set forth in the objects thereof and in the accompanying claims.

What is claimed is:

1. A device for matching the impedance between a loaded waveguide type slow-wave structure and an external waveguide divided by a partition wall in which said loaded waveguide type slow-wave structure comprises a plurality of axially aligned discs having apertures in the center thereof wherein two or more discs immediately adjacent said partition wall are provided with a coupling slot and coupling loop; the dimensions of said coupling loops diminishing as its associated disc is further removed from the partition wall to moderate the impedance gradient between the slow structure and the external waveguide.

2. The impedance matching device claimed in claim 1 wherein said coupling loop is orthogonal to the coupling slot associated therewith.

References Cited

UNITED STATES PATENTS

| | | | |
|---|---|---|---|
| 3,205,398 | 9/1965 | Allen | 315—3.5 |
| 3,233,139 | 2/1966 | Chodorow | 315—3.5 |
| 3,230,413 | 1/1966 | Chodorow | 315—3.5 |

HERMAN KARL SAALBACH, Primary Examiner

C. BARAFF, Assistant Examiner

U.S. Cl. X.R.

315—3.5